(12) United States Patent
Gaffar

(10) Patent No.: US 10,882,400 B2
(45) Date of Patent: Jan. 5, 2021

(54) SYSTEMS AND METHODS FOR IMPROVED VEHICULAR SAFETY

(71) Applicant: Ashraf Gaffar, Tempe, AZ (US)

(72) Inventor: Ashraf Gaffar, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

(21) Appl. No.: 16/578,114

(22) Filed: Sep. 20, 2019

(65) Prior Publication Data

US 2020/0094678 A1 Mar. 26, 2020

Related U.S. Application Data

(60) Provisional application No. 62/733,986, filed on Sep. 20, 2018.

(51) Int. Cl.

| | |
|---|---|
| *G02B 27/01* | (2006.01) |
| *B60K 35/00* | (2006.01) |
| *B60K 37/06* | (2006.01) |
| *H04W 4/46* | (2018.01) |
| *G08G 1/052* | (2006.01) |
| *G08G 1/16* | (2006.01) |
| *H04L 12/40* | (2006.01) |

(52) U.S. Cl.
CPC .............. *B60K 35/00* (2013.01); *B60K 37/06* (2013.01); *G08G 1/052* (2013.01); *G08G 1/163* (2013.01); *G08G 1/166* (2013.01); *H04L 12/40019* (2013.01); *H04W 4/46* (2018.02); *B60K 2370/1529* (2019.05); *B60K 2370/785* (2019.05); *H04L 2012/40215* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 2009/0083656 A1* | 3/2009 | Dukhon | G06F 40/166 715/781 |
| 2012/0117601 A1* | 5/2012 | Yeh | H04N 21/4316 725/42 |
| 2016/0103319 A1* | 4/2016 | Remillard | G02B 27/01 345/1.3 |
| 2019/0031102 A1* | 1/2019 | Kishimoto | G06T 7/73 |

OTHER PUBLICATIONS

Pioneer Corporation, "Pioneer Introduces the New CYBER NAVI Car Navigation system in Japan With the world's first Head-Up Display to project augmented reality information in front of the windscreen" [online], Pioneer Corporation News Release, May 2012 [retrieved Aug. 17, 2020], retrieved from the internet <https://global.pioneer/en/news/press/2012/pdf/0511-1.pdf>.

(Continued)

*Primary Examiner* — Brent Swarthout
(74) *Attorney, Agent, or Firm* — Polsinelli PC

(57) ABSTRACT

Embodiments of a vehicular system with an L-shaped infotainment display for reducing driver distraction and improving safety are disclosed.

10 Claims, 9 Drawing Sheets

(56) References Cited

OTHER PUBLICATIONS

King, I. et al. "The Car Windshield Is Turning Into a Computer Screen" [online], Bloomberg Technology, Jan. 2015 [retrieved Aug. 17, 2020 from archive.org, as it appeared on Sep. 7, 2016], retrieved from the internet <https://web.archive.org/web/20160907134332/http://www.bloomberg.com/news/articles/2015-01-22/the-car-windshield-is-turning-into-a-computer-screen>.

Market Wired, "Navdy Reinvents the Driving Experience—Ships First Augmented Driving Device" [online], Market Wired Newsroom, Oct. 2016 [retrieved Aug. 17, 2020 from archive.org, as it appeared on Nov. 26, 2016], retrieved from the internet <https://web.archive.org/web/20161126094442/http://www.marketwired.com/press-release/navdy-reinvents-the-driving-experience-ships-first-augmented-driving-device-2169382.htm>.

Charman, A., "Paris show—Renault stuns with Trezor" [online], The Car Expert, Sep. 2016 [retrieved Aug. 14, 2020], retrieved from the internet <https://www.thecarexpert.co.uk/paris-show-renault-gt-concept-dubbed-trezor/>.

Pioneer Corporation, "Pioneer Introduces New CYBER NAVI Car Navigation Systems for Japan Market" [online], Pioneer Corporation News Release, May 2013 [retrieved Aug. 17, 2020], retrieved from the internet <https://global.pioneer/en/news/press/index/1617>.

Exploride, "Turn your care into a smart car" [online], Exploride, 2016 [retrieved Aug. 17, 2020 from archive.org, as it appeared on Oct. 13, 2016], retrieved from the internet <https://web.archive.org/web/20161013111904/https://exploride.com/>.

Hudway Glass, "Hudway Glass" [online], Hudway Glass, 2016 [retrieved Aug. 17, 2020 from archive.org, as it appeared on Oct. 4, 2016], retrieved from the internet <https://web.archive.org/web/20161004132435/http://hudwayglass.com/>.

Navdy, "Look Forward. Stay Connected." [online], Navdy, 2016 [retreived Aug. 17, 2020 from archive.org, as it appeared on Oct. 30, 2016], retrieved from the internet <https://web.archive.org/web/20161030212944if_/https://www.navdy.com/#order-now>.

\* cited by examiner

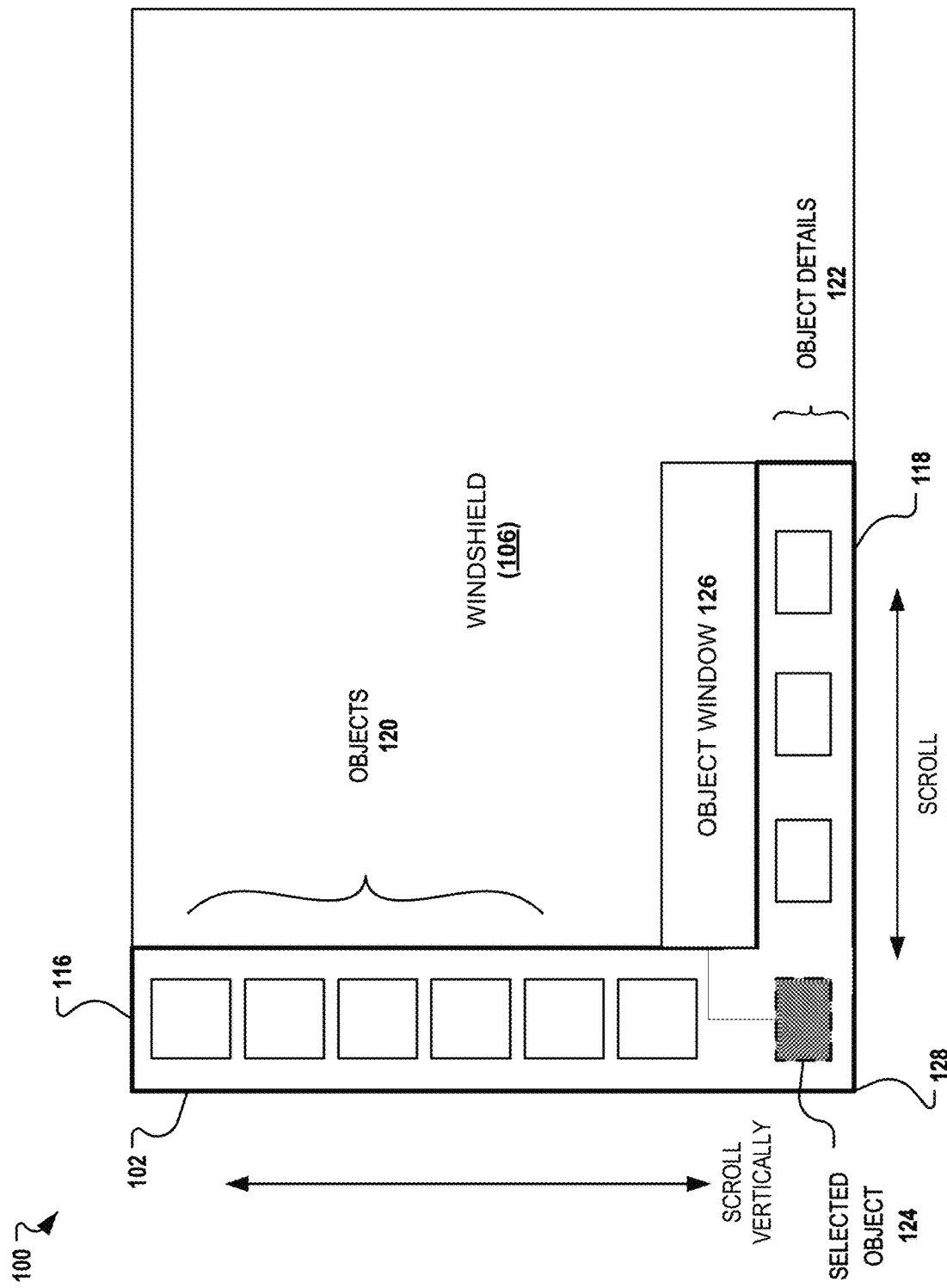

SYSTEMS AND METHODS FOR IMPROVED VEHICULAR SAFETY

FIELD

The present disclosure generally relates to safety systems for vehicles; and more particularly to a plurality of vehicle safety features including e.g., an enhanced L-shaped infotainment device that enhances safety and reduces driver distraction.

BACKGROUND

Distraction generally can be defined as the ratio between cognitive load exerted by external or internal factors needing attention, and cognitive ability represented by the person's ability to pay attention to and react to events. Driver distraction is a major cause of death in the United States and is the primary cause of fatalities among teenagers. The driving process is inherently distractive, as drivers need to assess the rear and side positions of the vehicle, view gauges and other features of the dashboard, and engage with the gas pedal and brake, all while maintaining attention to the road in front of them. Further, different driving situations impose different levels of cognitive load and hence require different levels of a driver's attention.

However, modern cars are manufactured with a growing number of distracting technologies on board which exacerbates issues related to driver distraction. For example, current infotainment systems and devices and/or in-dash screens, which may be connected to the driver's cell phone, may display a variety of distracting symbols, notifications, or other such graphical software features. In addition, different states have different laws regarding distracted driving (e.g., texting and use of a cell phone while driving), which may be difficult if not impossible to enforce, and interaction with a large digital screen in a vehicle's dashboard (such as an infotainment system) is rarely prohibited or restricted.

It is with these observations in mind, among others, that various aspects of the present disclosure were conceived and developed.

BRIEF DESCRIPTION OF THE DRAWINGS

FIG. 1B is a simplified block diagram of one embodiment of an L-shaped infotainment display for enhancing vehicle safety.

Corresponding reference characters indicate corresponding elements among the view of the drawings. The headings used in the figures do not limit the scope of the claims.

DETAILED DESCRIPTION

The present disclosure relates to systems and methods for reducing driver distraction and for generally improving vehicular safety. In some embodiments, the present inventive concept may take the form of an improved infotainment system including an L-shaped infotainment display positioned along a more suitable viewing area for the driver; e.g., along the driver's viewing area of a vehicle windshield or generally in front of the driver.

Figure 1A:
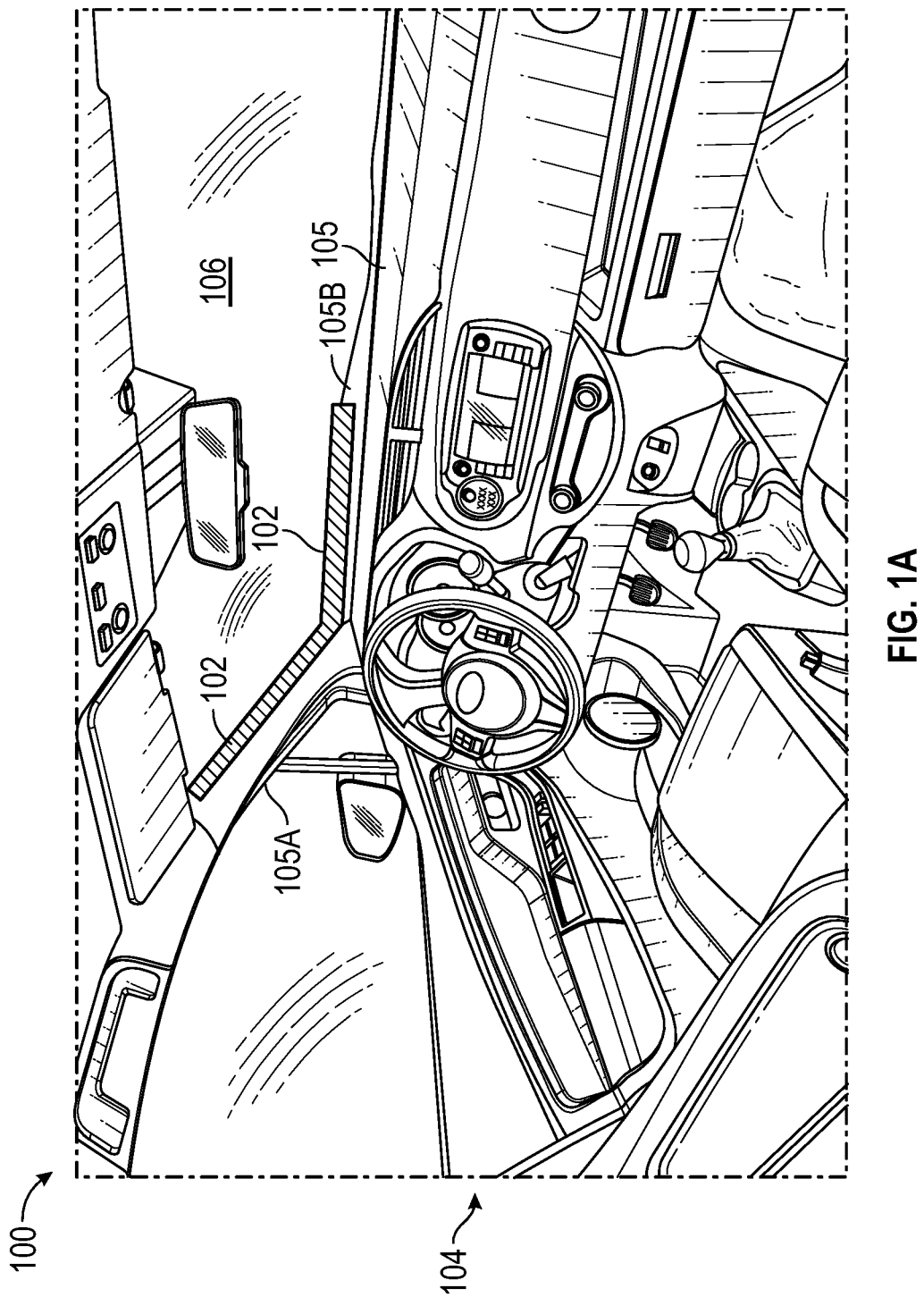
FIG. 1A is a notated photograph of an infotainment system including a vehicle with an L-shaped display as described herein.
Figure 2:
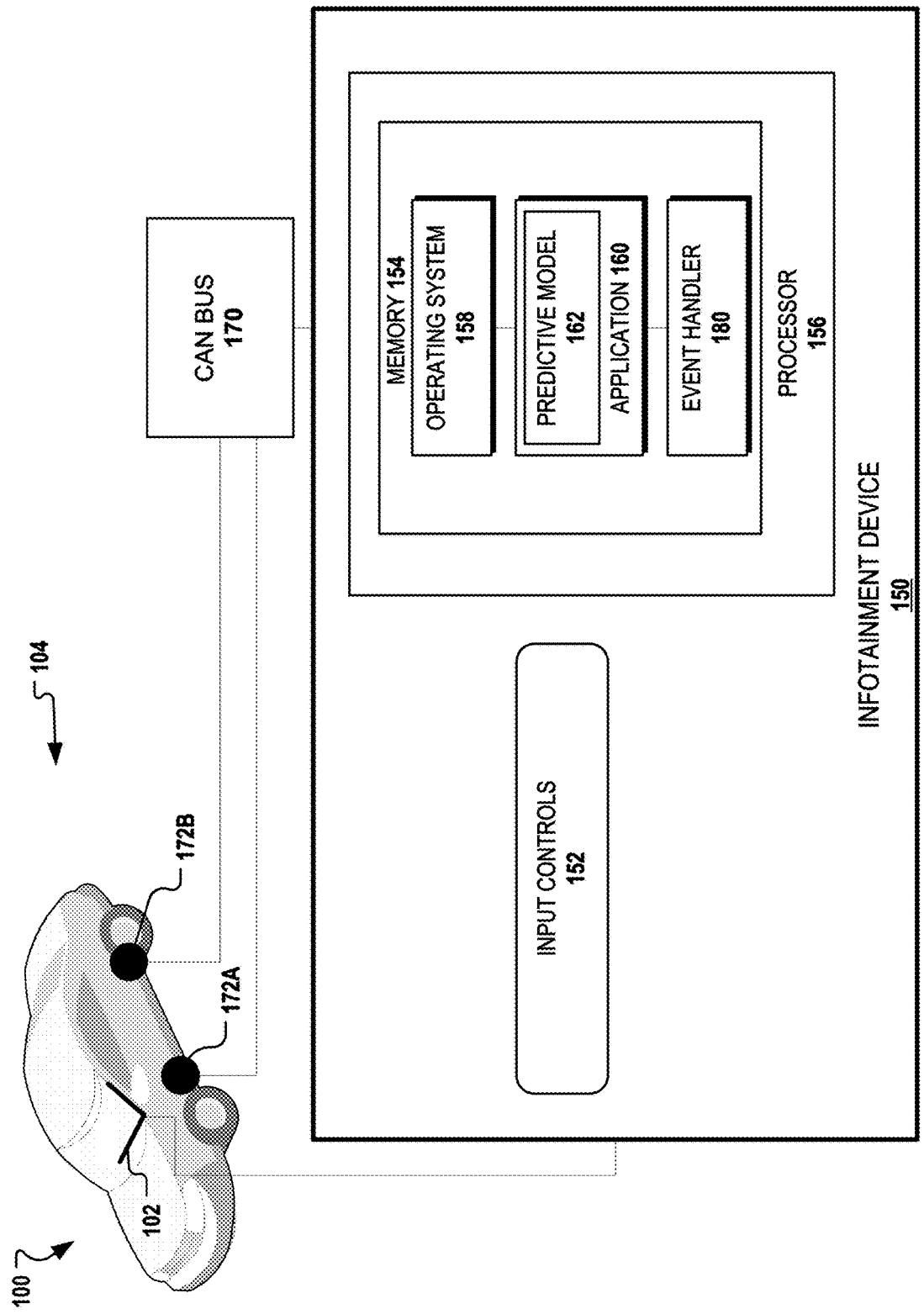
FIG. 2 is a simplified block diagram of one embodiment of an infotainment device which may be deployed with the L-shaped infotainment display of FIG. 1A.

Referring to FIG. 1A, an infotainment system (hereinafter "system") 100 is shown that improves upon vehicular safety technologies. The system 100 includes an L-shaped infotainment display 102 which may be deployed with any vehicle 104 (such as an automobile) that reduces driver distraction and is positioned or otherwise implemented in a different, safer location to improve the driver's ability to focus on the road while operating a vehicle. By way of explanatory introduction, car (or other vehicle) cockpits generally are manufactured with limited space for an interactive touch screen. Besides screen size, location of any screen of an infotainment device can cause the driver to become distracted as they may be required to look away from the road (generally down and to the right) to interact with center-stacked screens. In addition, conventional infotainment devices include screens or displays that unduly occupy valuable space, and inundate the driver with a large amount of information which may cause the driver to move their eyes from the road (generally over the steering assembly) to the center stack, or down below, to view such devices.

In view of the aforementioned technical issues and considerations associated with infotainment devices, the system 100 provides a technological improvement in the form of an enhanced, L-shaped infotainment display 102 positioned within the vehicle 104 as shown. In particular, the L-shaped infotainment display 102 may be positioned (mounted to or otherwise integrated) along a perimeter 105 of a windshield 106, such the L-shaped infotainment display 102 extends along a vertical portion 105A of the perimeter 105 and also along a horizontal portion 105B of the L-shaped infotainment display 102 in the manner shown.

Referring to FIG. 1B, in one embodiment the L-shaped infotainment display 102 may include a vertical portion 116 displaying a list of objects 120 that the driver can scroll through vertically (such as music functions, phone/phone contacts, web functions, etc.), and a horizontal portion 118 in communication with the vertical portion 116 and generally extending in an orthogonal fashion relative to the vertical portion 116. The horizontal portion 118 displays object details 122 associated with the objects 120. The object details 122 may come into focus, and the driver may navigate over a selected object 124 and select any action related to the selected object 124. The infotainment display 102 shown may be positioned and fit ideally along the left and bottom corners of the windshield 106 providing ample space for navigating digital features of an infotainment device without requiring a complete rectangular space. In some embodiments, even further details or information associated with the selected object 124 may be depicted along an object window 126.

In some embodiments, the vertical portion 116 may define an elongated narrow digital screen or display portion (e.g., 2-3 inches wide×20 inches long) and may extend along the vertical beam supporting the roof of a vehicle. In this manner, the vertical portion 116 does not obscure views of the driver. The horizontal portion 118 may also be generally narrow and elongated and may define a digital display portion connected to the vertical portion 116 along a corner 128 of the display 102 as shown. In some embodiments, the horizontal portion 118 may be 3-4 inches wide by 30 inches in length, but the dimensions of the vertical portion 116 and horizontal portion 118 may vary so long as the L-shape configuration shown is provided and the driver's view through the windshield 106 is not obstructed.

Navigation of the objects 120 along the display 102 may be achieved using vertical and horizontal mechanical wheels (not shown) integrated into the steering wheel (not shown) to accommodate vertical and horizontal scrolling through the objects 120 as indicated. In some embodiments, while holding the steering wheel, the driver may scroll along a wheel integrated along or proximate to the steering wheel using a thumb or finger to select a desired one of the objects 120 and view object details 122 associated with the same. In some embodiments, as the objects 120 shown may repeat themselves so that the driver can cycle through an entire set of the objects 120 without having to change scrolling directions. In other words, the objects 120 listed along the vertical portion 116 may rotate in a continuous circular motion such that when objects 120 reach the top or bottom of the vertical portion 116, the objects 120 may disappear but then reappear in sequence along the opposite side. In some embodiments, actions can be executed according to the selected object 124 by superimposing such actions along the horizontal portion 118 or the object window 126. The horizontal portion 118 and/or the vertical portion 116 may further be divided into sub-displays, windows, or regions to accommodate additional features. For example, the vertical portion 116 may include multiple vertical columns, and the horizontal portion 118 may include multiple horizontal rows to render even more features to the user. These additional rows and columns may be modified or hidden as desired to generally minimize the information displayed to the user.

The L-shaped infotainment display 102 described maximizes information output and interaction without occupying an undesired amount of space along the dashboard of the vehicle 104, and offers easier engagement for the driver with objects presented in scrolling lists. Further, because the display 102 is positioned proximate to where the driver views the road, the display 102 enables the driver to direct his or her vision along the road for greater periods of time, even during engagement with the display 102.

Referring to FIG. 1B, an infotainment device 150 is shown which may be in communication with the L-shaped display 102 and may support features and functionality thereof. The infotainment device 150 may be positioned anywhere along the vehicle 104 (e.g., embedded within the steering wheel), and may include a collection of hardware and software components associated with radio, navigation, phone functionality for managing data associated with calls and texts, and the like for supporting functionality and features of the L-shaped display 102. In some embodiments, the infotainment device 150 and may include one or more input controls 152 such as dials, keypads, wheels, buttons, or other such controls to access features of or otherwise interact with the L-shaped infotainment display 102.

As further shown, the infotainment device 150 may include or otherwise be in operable communication with a memory 154 or storage device, (at least one of) a processor 156 or electronic control unit (ECU), configured to execute a vehicle operating system (operating system 158) stored in the memory 154 for issuing instructions and managing the infotainment device 150 including its software and hardware peripherals. The processor 156 may further execute an application 160 defining instructions and software functionality for managing aspects of the L-shaped display 102. In some embodiments, the application 160 may define a predictive model 162 stored in the memory 154, which may include any number or type of machine learning or artificial intelligence model for adapting the L-shaped display 102 based on information associated with the vehicle 104 or driver.

In some embodiments, the infotainment device 150 is in operable communication with a control area network bus (CAN BUS or any other vehicular data bus) 170 and a plurality of subsystems 172 defined along the vehicle 102 (designated subsystem 172A and 172B). The CAN BUS 170 allows sensors and microcontrollers of the different subsystems 172A and 172B to communicate with each other, and the subsystems 172 may include sensors, microcontrollers, or mechanical components specific to certain portions or functions of the vehicle 104. The CAN BUS 170 may further communicably couple together one or more electronic control units (ECUs) (not shown) positioned along the vehicle 104 and implemented as part of any of the subsystems 172 or otherwise. For example, a first subsystem 172A may be used for the transmission of the vehicle 104, and a second subsystem 172B may be used for operations of the doors, and the CAN BUS 170 may accommodate data sharing or interconnection between these subsystems, or separate control actuators, or sensors (not shown).

As further shown, in some embodiments the infotainment device 150 may leverage data from an event handler 180 implemented by the processor 156 or one or more ECUs along the vehicle 104. The event handler 180 may be in operable communication with the CAN BUS 170 and may track activity of the driver or of the vehicle 104 (based on data extracted from the subsystems 172) which may be processed or otherwise leveraged by the application 160 to modify features or functions associated with the display 102. For example, the application 160 may extract or access information about driving conditions of the vehicle 104 based on events tracked by the event handler 180 (such as the use of gas and brake pedals, the acceleration or deceleration information generated by the car, the presence and rate of lane change, swerving and the driving style/type of the driver, various steering wheel movements, the car state of motion and speed as well as geolocation proximate to an intersection or traffic lights, and the like). In other words, using a classifier or other machine learning method defined by the predictive model 162, the application 160 may be configured to identify features or parameters such as speed, acceleration, and other variables from data generated by the event handler 180, which may be used to determine a corresponding driving conditions classification or class given the driving conditions (e.g., low, moderate, or high, on a scale or otherwise). This classification may then be leveraged to modify aspects of the display 102 as desired. For example, where the application 160 and the predictive model 162 output a driving conditions classification indicating that the driver is stopping and starting frequently such that traffic may be heavy, the size of aspects of illuminated along the display 102 or functionality thereof may be reduced.

In some embodiments, the application 160 comprises a plug-in, add-on, extension, or update to the vehicle operating system 158 to execute the functionality described herein. In other embodiments, the application 160 may merely be loaded into the memory 154 by a wired or wireless connection and may be logically layered over the operating system 158 as a separate application. In these embodiments, the application 160 issues requests or instructions to the operating system 158 or any application managing functionality associated with the infotainment device 150. In some embodiments, the application 160 may be programmed in any programming language or programming framework (C, C++, Java, Python, Matlab . . . , or the like). The application 160 may be programmed with a specialized class object (not shown) configured to interpret data from the event handler 180 associated with driving conditions and driver interaction with the infotainment device 150.

Figure 3A:
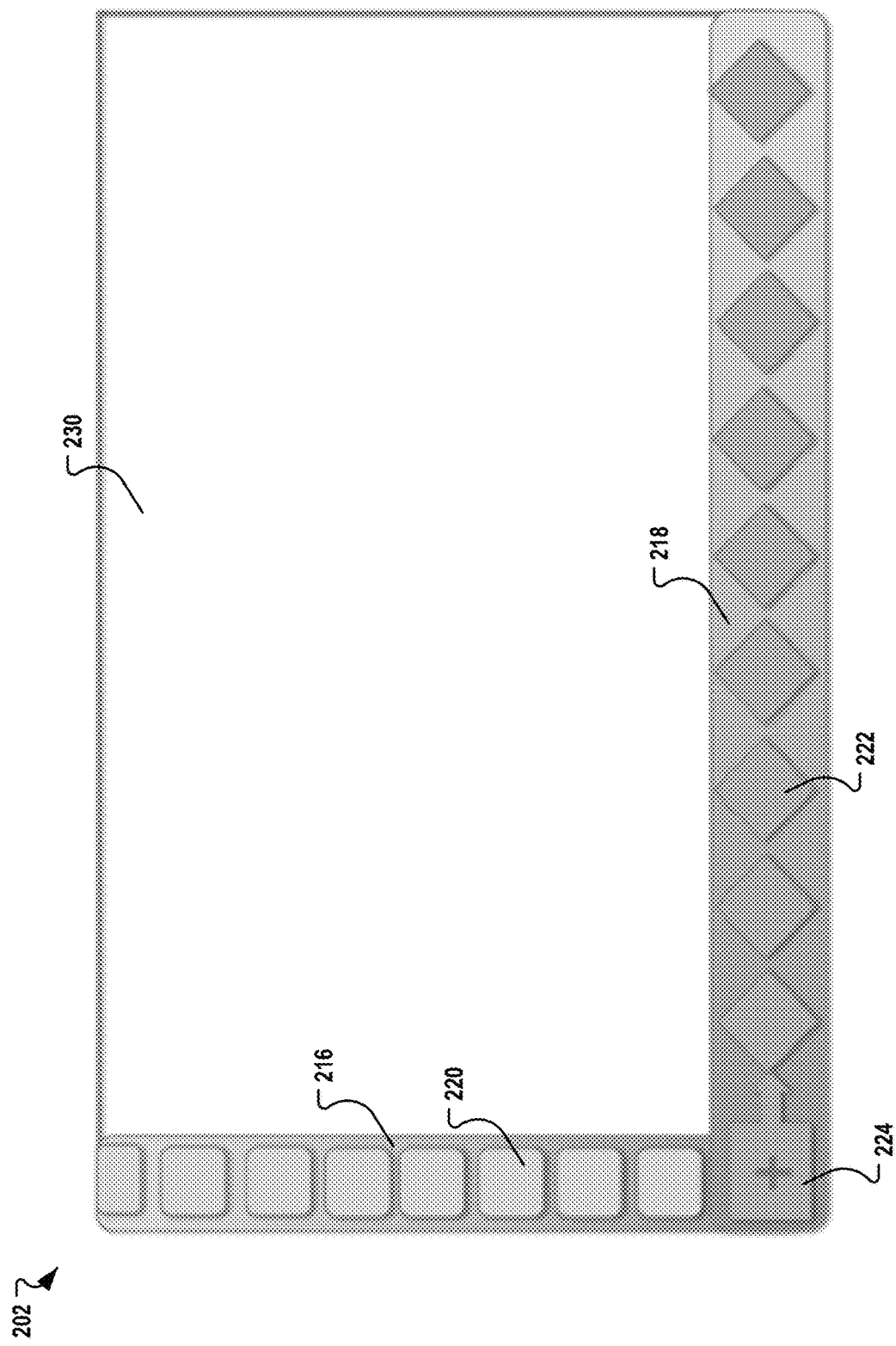
FIGS. 3A-3E are simplified illustrations of another embodiment of an L-shaped infotainment display and indicate various possible features and functions as described herein.

Referring to FIG. 3A, another embodiment of an L-shaped infotainment display 202 is shown. Similar to the display 102, the L-shaped infotainment display 202 may include a vertical portion 216 displaying a list of objects 220 that the driver can scroll through vertically (such as music functions, phone/phone contacts, web functions, etc.), and a horizontal portion 218 in communication with the vertical portion 216 and generally extending in an orthogonal fashion relative to the vertical portion 216. The horizontal portion 218 may display object details 222 associated with the objects 220. The object details 222 may come into focus, and the driver may navigate over a selected object 224 and select any action related to the selected object 224. The infotainment display 202 shown may be positioned and fit ideally along the left and bottom corners of any windshield (such as the windshield 106) providing ample space for navigating digital features of an infotainment device without requiring a complete rectangular space. In some embodiments, even further details or information associated with the selected object 224 may be depicted along an object window 230.

Figure 3B:
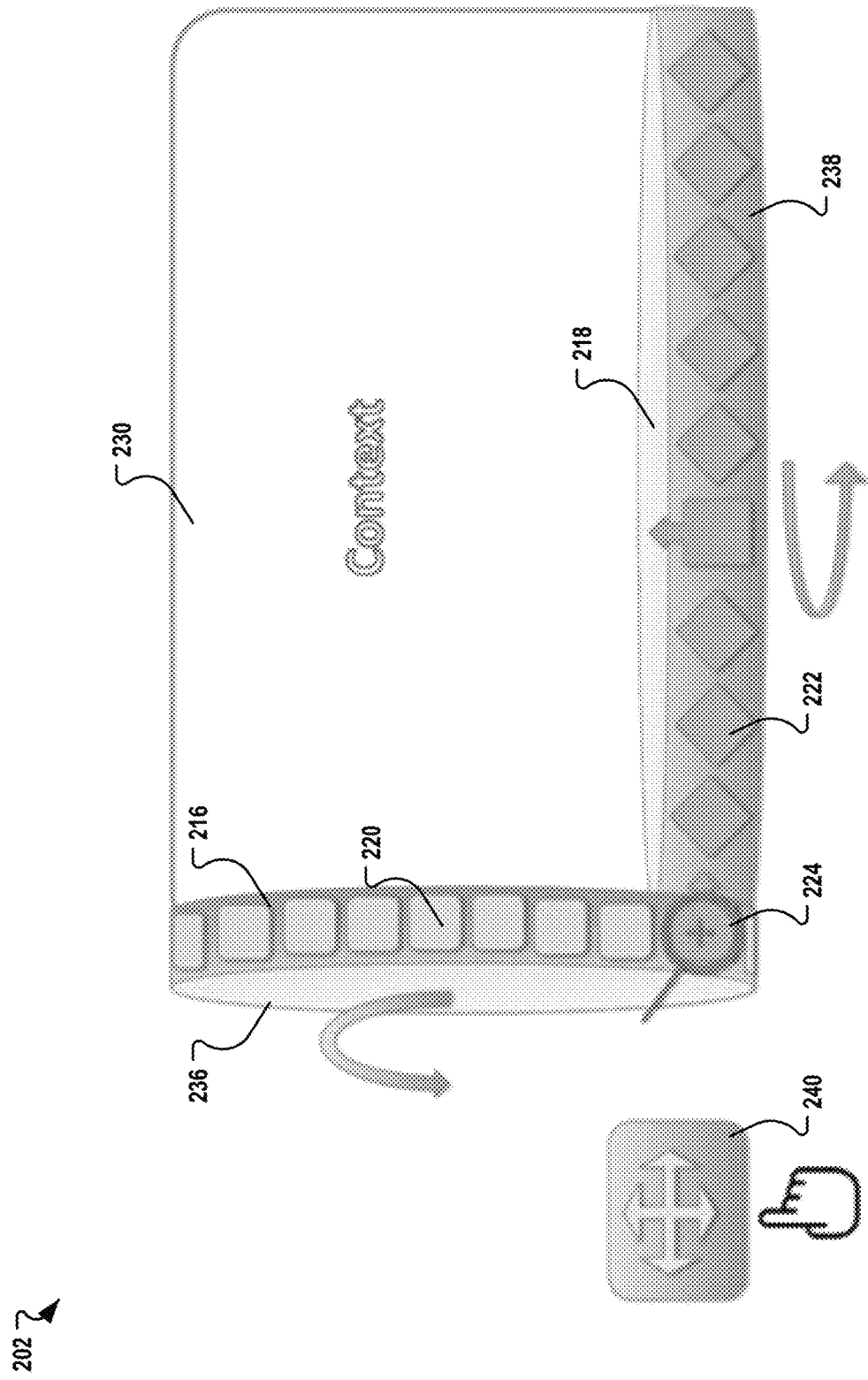
Figure 3C:
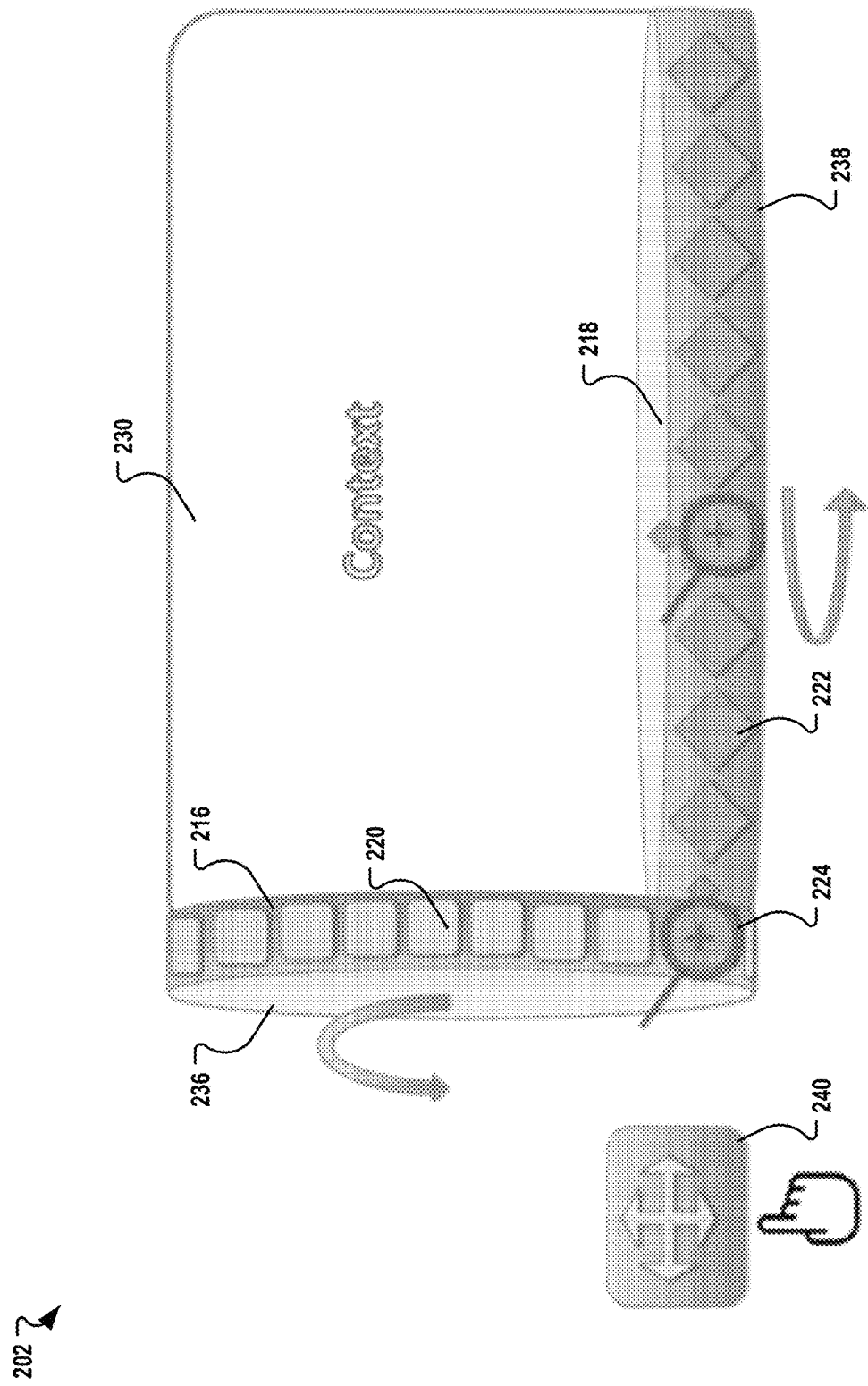

Referring to FIGS. 3B-3C, as shown, both the vertical portion 216 and the horizontal portion 218 may include virtual disks capable of rotation by a user engaging the display 202 so that the user can cycle through various ones of the objects 220 and corresponding details 222. Specifically, the vertical portion 216 may define a vertical disk 236 and the horizontal portion 218 may define a horizontal disk 238. In some embodiments, virtual circular motion of the vertical disk 236 accommodates browsing through the objects 220 as a list, and virtual circular motion of the horizontal disk 238 accommodates browsing of the object details 222, while keeping a selected object 224 in focus. The object window 230 may display context information of the in-focus detail item; i.e., the selected object 224. Further in FIG. 3B, a control/touch pad 240 is deployed with the display 202 which may be implemented along a steering wheel (not shown) or other suitable location for access by a user.

Figure 3D:
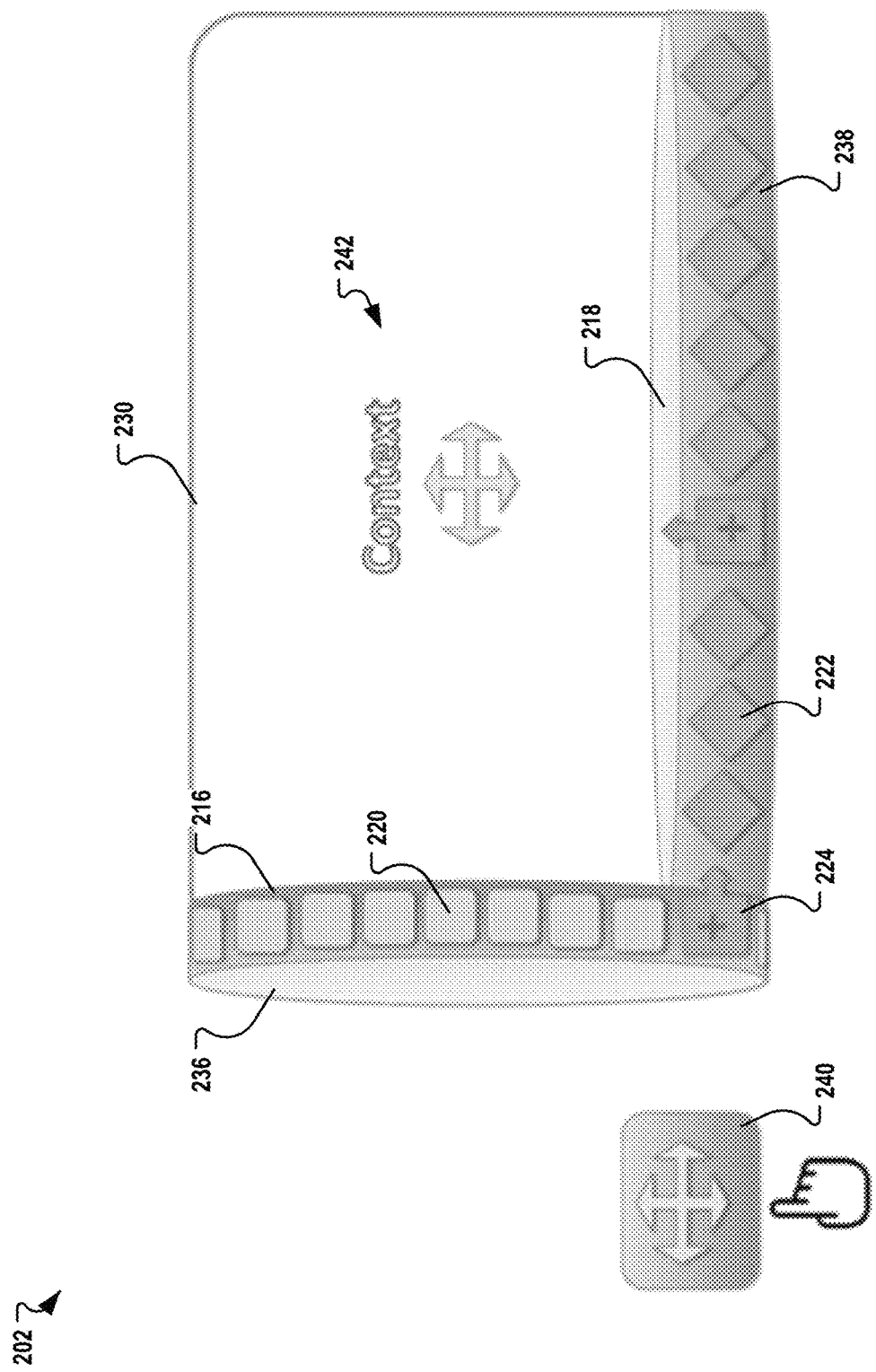

Referring to FIG. 3D, engaging the control pad 240 may allow a user to interact with the display 202 and modify what is rendered thereon. For example, a click (or a double tap) may switch what is displayed along the object window 230 to context information about the selected object 224. The context 242 displays context-related items and can be put in focus with a 2-D finger motion along the control pad 240. An in-focus or selected object 224 can be activated with a click/double-click, tab-and-hold, or any other interaction dimension. When an in-context or an in-focus object is engaged, its functionality is expanded in the object window 230 identified by the context 242 and is interactive using the control pad 240.

Figure 3E:
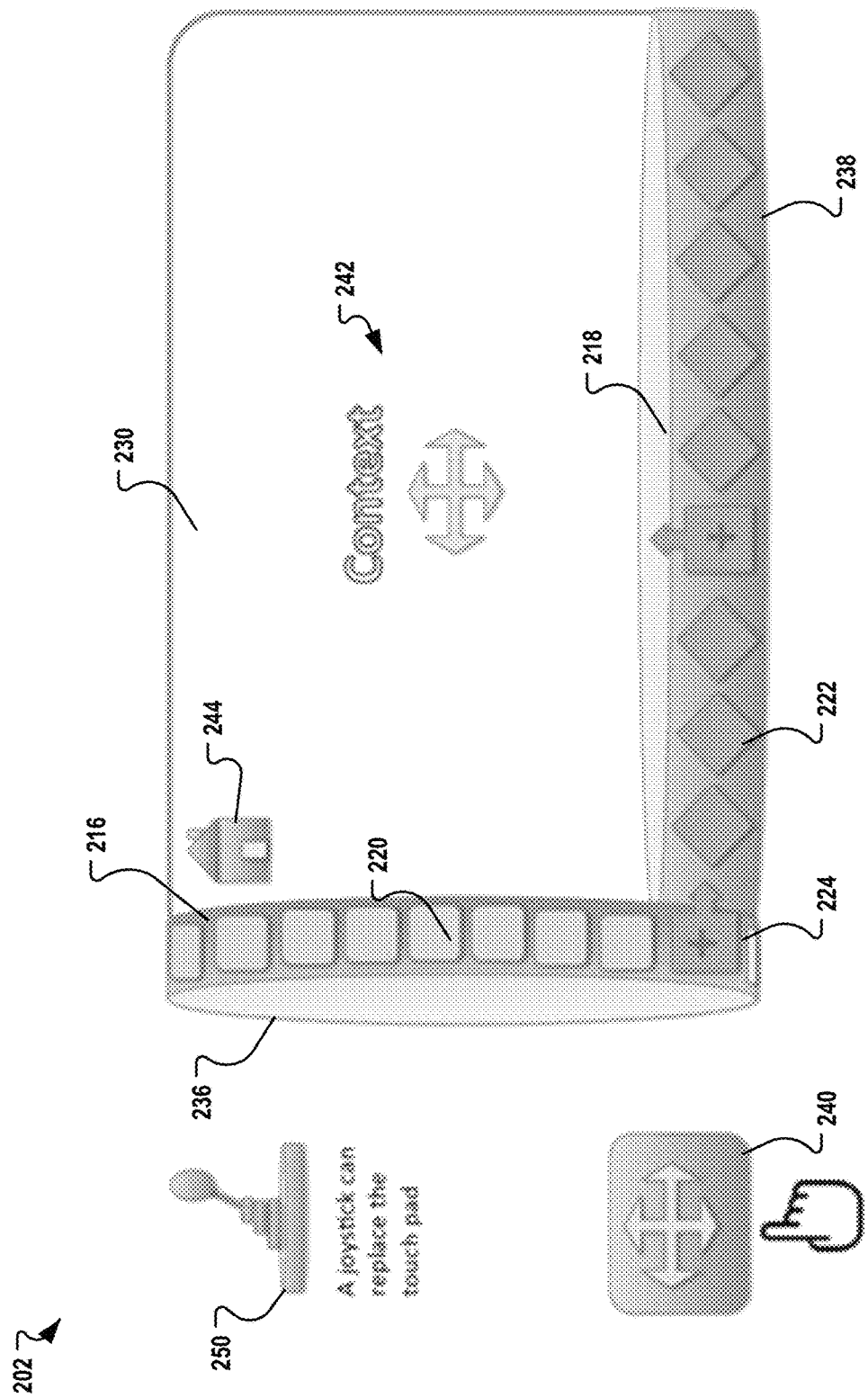
Figure 4:
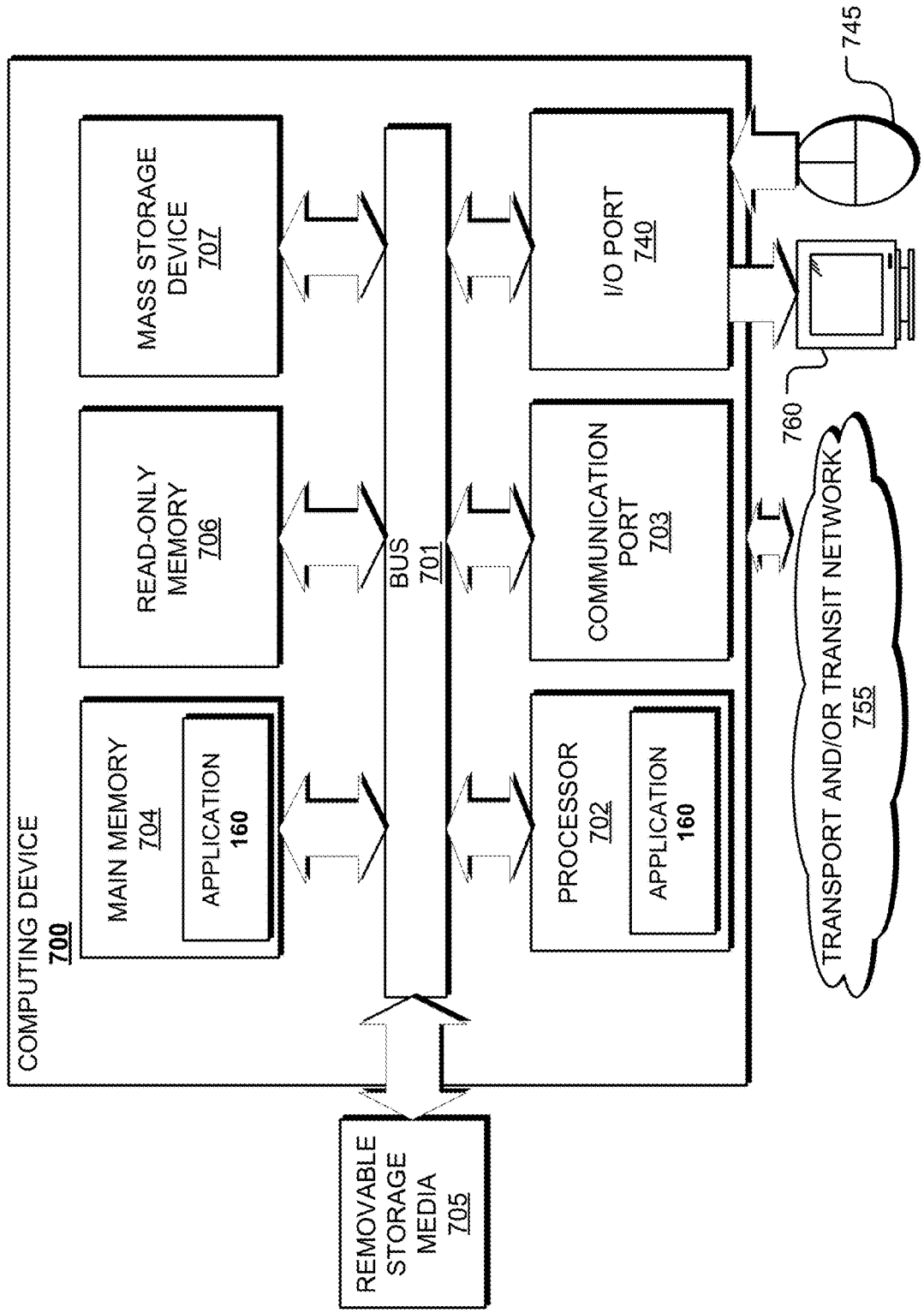
FIG. 4 is a simplified block diagram depicting an exemplary computing device that may implement various services, systems, and methods discussed herein.

Referring to FIG. 3E, additional possible features of the display 202 are illustrated. As shown, a home icon 244 may be rendered along the display 202 and engaged to exit from the content 242 of the object window 230 (to e.g., activate context navigation). The home icon 244 may further be engaged to return the user back to a browsing mode of list and details of the objects 220 by engaging the vertical disk 236 and the horizontal disk 238. In addition, a joystick 250 may be deployed with and in operable communication with the display 202 which may replace or supplement the control pad 240 and functionality thereof.

The L-shaped displays 102 and 202 described herein may be implemented or take the form of any number of display technologies. The L-shaped displays 102 and 202 may be physical displays (physical display screens), virtual displays (heads-up or augmented), or combinations thereof. In some embodiments, the L-shaped displays 102 and 202 may include heads-up display features. In this manner, the L-shaped displays 102 and 202 (or portions thereof) may comprise transparent displays such that data may be presented as illustrated along the viewing angle of a user. Various possible methods of forming the L-shaped displays 102 and 202 as heads-up displays (HUDs) are contemplated. The L-shaped displays 102 and 202 may be projected using the windshield glass to display information along the windshield. Alternatively, a combiner may be leveraged capable of retraction that uses a partially reflective screen to display information in to the user. In either case, deploying the L-shaped displays 102 and 202 as HUDs may reduce added structural components that need to be integrated within a vehicle to implement the L-shaped displays 102 and 202, and may allow a user to better maintain focus along a road or along a travel path proximate to the line-of-sight of the user operating the given vehicle (in the case where the L-shaped displays 102 and 202 are used within aircraft).

In some embodiments, aspects of the L-shaped displays 102 and 202 may include touch screen technology. In this fashion, the L-shaped displays 102 and 202 may essentially comprise input and output functions and may be layered along a general visual display of an infotainment system. A user may interact with the L-shaped displays 102 and 202 by applying predetermined gestures such as finger-swipes, taps, or other gestures along the L-shaped displays 102 and 202. When using touch-screen technology, the L-shaped displays 102 and 202 may include one or more position/pressure sensors and accompanying firmware for providing the touch-screen functionality and functionality of the L-shaped displays 102 and 202 such as navigating to certain objects, activating objects to e.g., make phone calls, and the like.

Numerous related features are contemplated. It is further contemplated that any features of display 102 may be implemented with display 202 and vice versa. The displays 102 and 202 may further be implemented in any environment where it is desired to better organize object items and/or render object items in such a way so that the line-of-sight of the user is not obstructed by the object details. Unlike current infotainment systems for example, which require a driver to re-orient after glancing at or engaging an in-dash infotainment device, the present concept allows a user to maintain his/her focus along an important view such as the travel path. The displays 102 and 202 may be applied within aircraft, naval equipment, or any number or type of vehicles and may further be implemented for a more organized user interface for, e.g., a power point presentation.

Selection: In some embodiments, the vertical portion 116 of the L-shaped display 102 renders several items in a vertical sequence. One item of the objects 120 is automatically selected when it moves into the focus area (the pivot or corner 128) at the lower part/corner. This "in-focus" item or object is automatically detailed in the horizontal portion 118. As the user scrolls the vertical items of the vertical portion 116, the one item that comes at the pivot is expanded (its contents may be displayed) in the horizontal portion 118. In some embodiments, a user can navigate these vertical and horizontal portions by the corresponding vertical and horizontal movement of a 4-dimensional scroll ball/trackball embedded in a vehicle steering wheel (allowing vertical and horizontal scrolling). Additional selection or interaction options may include functionality where if any action is associated with one (detail) item in the horizontal portion, the interaction can be done by clicking/double clicking on the trackball mentioned above.

Deep Nesting/Drill Down: The shown setup includes one vertical portion (bar) for "listing items" and one horizontal portion (bar) for showing details of one item from the vertical list. In other setups, the horizontal bar can show more than one level of list-details. In another setup, multiple levels of list-details can be displayed by moving the items from horizontal bar to vertical bar to reveal an additional level of details as the user drills down a multi-level hierarchy.

FIG. 6 is an example schematic diagram of a computing device 700 that may implement various methodologies discussed herein. For example, the computing device 700 may comprise any number or form of computing device used to execute the application 160 or aspects of the system 100 described herein. The computing device 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computing device 700 connects. Computing system may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 is encoded with applications that support functionality as discussed herein. At least a portion of these applications (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret, or otherwise perform processes, such as through logic instructions, executing on the processor 702 and associated software modules stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for improved vehicular safety, comprising:
a display positioned along a perimeter of a vehicle windshield proximate to a line of sight associated with an operator of the vehicle, the display being L-shaped, and including:
a vertical portion extending along a lateral side of the vehicle windshield, the vertical portion rendering a list of objects in a vertical sequence including a selected object, and
a horizontal portion in communication with the vertical portion, the horizontal portion defining object details associated with the selected object of the list of objects, the selected object being selected by scrolling vertically through the list of objects.

2. The system of claim 1, wherein the selected object is positioned along a corner defined at an intersection of the vertical portion and the horizontal portion, the selected object rendered proximate to other objects of the list of objects.

3. The system of claim 2, wherein the object details displayed along the horizontal portion is limited to information about the selected object.

4. The system of claim 1, further comprising:
a control area network BUS (CAN BUS) deployed along the vehicle for integrating information associated with subsystems of the vehicle; and
an infotainment device positioned along the vehicle and in operable communication with the CAN BUS and the display, the infotainment device including a processor having access to data of an event handler related to activity associated with the subsystems of the vehicle, the processor configured to modify the display based on predetermined events of the event handler.

5. The system of claim 1, further comprising one or more input controls positioned along the vehicle for interacting with and modifying the display.

6. The system of claim 5, wherein the input controls include a control pad, wheel, or joystick.

7. The system of claim 1, wherein the list of objects is rotatable continuously along the vertical portion of the display such that a given object can be repeatedly shown in the vertical portion without a change in a scrolling direction of the list of objects.

8. The system of claim 1, wherein the vertical portion includes multiple vertical columns positioned along the lateral side of the vehicle.

9. The system of claim 1, wherein the horizontal portion includes multiple levels of object list details to provide a hierarchy of object details associated with the selected object.

10. A system for improved vehicular safety, comprising:
a display positioned along a perimeter of a vehicle windshield proximate to a line of sight associated with an operator of the vehicle, the display being L-shaped, and including:
a vertical portion extending along a vertical beam supporting a roof of the vehicle adjacent to the vehicle windshield, the vertical portion rendering a list of objects in a vertical sequence including a selected object, and
a horizontal portion in communication with the vertical portion, the horizontal portion defining object details associated with the selected object of the list of objects, the selected object being selected by scrolling vertically through the list of objects.

* * * * *